Jan. 27, 1970 R. E. HAZARD 3,491,885
APPARATUS FOR WASHING FILTER CAKE IN SOLVENT DEWAXING OPERATIONS
Filed Nov. 21, 1966 2 Sheets-Sheet 1

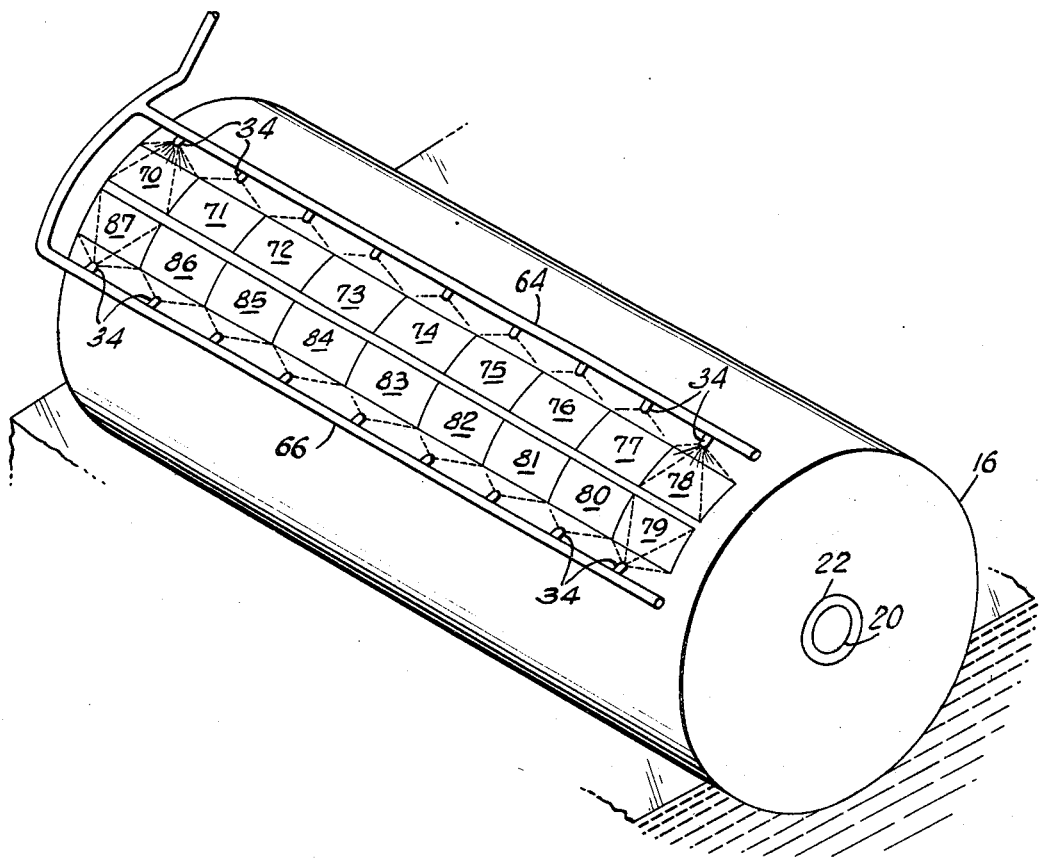

United States Patent Office 3,491,885
Patented Jan. 27, 1970

3,491,885
APPARATUS FOR WASHING FILTER CAKE IN SOLVENT DEWAXING OPERATIONS
Richard E. Hazard, Westport, Conn., assignor to Texaco Development Corporation, New York, N.Y., a corporation of Delaware
Filed Nov. 21, 1966, Ser. No. 595,716
Int. Cl. B01d *33/36*
U.S. Cl. 210—217                           1 Claim

ABSTRACT OF THE DISCLOSURE

Solid cone nozzles producing a rectangular spray pattern for applying wash solvent in solvent dewaxing filtering operations.

---

This invention relates to improvements in the solvent dewaxing of mineral oil. More particularly, this invention is concerned with improvements in the washing step during the filtering operation for the separation of crystallized wax from a chilled slurry containing crystallized wax, oil and dewaxing solvent.

The solvent dewaxing process for the removal of wax from petroleum fractions comprises the steps of adding a solvent to a wax-containing oil, chilling the solvent-oil-wax mixture to precipitate the wax therefrom and separating the wax from the mixture by filtration.

My invention may be employed in connection with either continuous or intermittent filters for separation of the wax. One form of filter may, for example, comprise a hollow rotating cylinder or drum having a permeable peripheral filter surface, usually fabric, with means for developing a pressure differential across the filter surface with a higher pressure on the outside of the cylinder than that on the inside thereof, either by creating a vacuum within the interior of the cylinder or by exerting positive pressure upon the exterior thereof, or by a combination of such vacuum and pressure.

In operation, the rotating cylinder is kept partially submerged in the mixture being filtered. Solids are deposited on the submerged portion of the filter surface to form a wax cake while liquid flows through the surface into the interior of the cylinder from which it is withdrawn as filtrate. As the cylinder rotates the cake is exposed, whereupon it may be dried and washed by applying solvent liquid to the surface of the cake, the solvent liquid being forced by the pressure differential through the cake into the interior of the cylinder for removal. The cake may be subjected to further drying to remove the remaining wash liquid following which the cake is removed, usually by applying a slight reverse pressure to the interior of the filtering element causing distention of the fabric and consequent loosening of the cake, complete removal of which is facilitated by suitable means located adjacent to the exterior surface of the filter fabric.

The step of washing the wax cake with a solvent liquid during rotation of the cylinder is performed for the purpose of removing a major portion of the oil adhering thereto. The wash solvent employed may be the same solvent used in dewaxing or, if desired, a wash solvent of different nature than the dewaxing solvent may be employed. Accordingly, when the term wash solvent is used herein, all modifications are contemplated.

It is the practice to apply a cold solvent wash to the rotating wax cake through an arrangement of sprays and weirs positioned above the liquid level in the filter. The resulting filtrate, composed of solvent and oil dissolved from the wax cake, is thereafter drawn off through an axial conduit, distilled and the overhead solvent fraction recovered for reuse. Heretofore, the wash solvent has generally been applied by means of headers fitted with a number of hollow cone sprays with the result that the wax cake is not as uniformly washed as is theoretically possible for a given quantity of wash solvent. Often it is possible to see excess solvent running down the face of the filter drum. It also has been noted that channelling of the wash solvent through the wax cake often occurs. Channelling is when the wash solvent tends to pass through the wax cake at points of least resistance while other areas receive very little solvent.

It is an object of my invention to provide apparatus for uniformly applying wash solvent to a wax cake on a rotary filter drum.

It is a further object of this invention to provide apparatus which will permit the use of a minimum amount of wash solvent for a given degree of oil removal from the wax cake.

In accordance with my invention wash solvent is applied to the surface of a wax cake on a rotating drum by means of spray nozzles producing solid cone distribution of the spray. Preferably I employ nozzles which give a rectangular spray pattern and position them such that the edges of the spray patterns at the surface of the wax filter cake coincide without leaving any unwashed areas and without undue overlapping.

In order to better understand the invention, reference will now be made to the accompanying drawings which disclose a preferred embodiment of the invention, in relation to a solvent dewaxing operation of a type described in U.S. Patent 2,134,331 which issued to W. P. Gee on Oct. 25, 1938 and in which:

FIG. 2 is a perspective view of the filter cake washing area of the rotary filter drum of FIG. 1.

Figure 1:
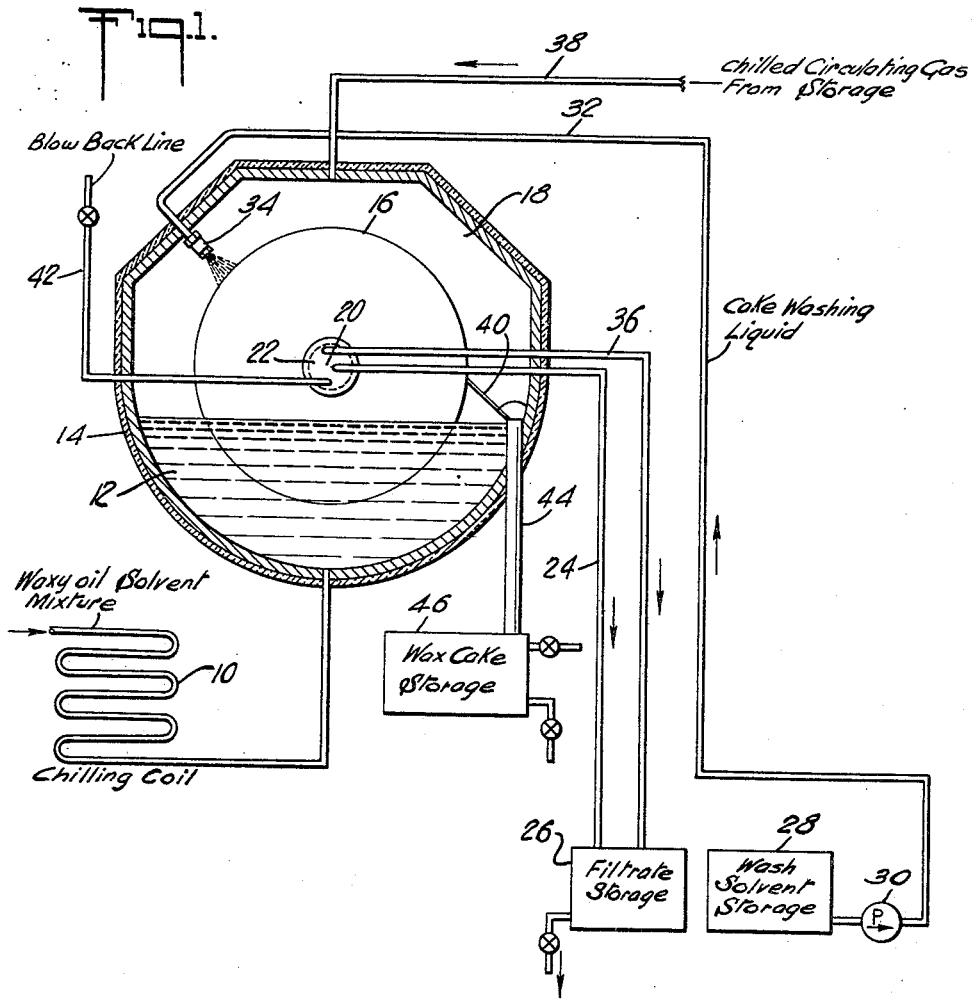
FIG. 1 is an elevational view partly in cross-section of a solvent dewaxing plant embodying the present invention.

Referring to FIG. 1, a wax-bearing mineral oil, such as cylinder stock, is advantageously mixed with a solvent liquid or wax-precipitating medium. This solvent liquid may comprise a light petroleum fraction, such as naphtha or various other organic solvent liquids or mixtures thereof, including alcohols, ketones, aldehydes, cyclic hydrocarbons, benzol or its homologues, or derivatives of these various materials.

The mixture of oil and solvent liquid is delivered from a source not shown in the diagram and conducted through a chilling coil 10 wherein it may be cooled to a temperature of around 0° F. or below. This chilled mixture of oil and precipitated wax is then conducted to the vat 12 of a filter which is advantageously of the continuous rotating drum type. The exterior of the filter shell is covered with heat-insulating material 14 to facilitate maintaining the interior in a cool condition.

During rotation of the hollow drum 16, the cylindrical surface thereof comprising a filtering surface or medium formed from cloth or metal fabric or any porous filtering material, passes through the body of filtering mixture maintained in the vat 12 of the filter, and then emerges therefrom during passage through the upper and hooded portion 18 of the filter.

The precipitated wax is deposited upon the exterior and submerged portion of the surface to form a filter cake, while the solvent and dissolved oil are forced through the filter surface into the interior of the drum. The liquid within the interior of the drum is withdrawn therefrom through the hollow rotating shaft 20, the filter valve 22, the pipe 24 in communication therewith, and into a filtrate storage tank 26.

When that portion of filter surface over which filter cake is deposited emerges from the cold filtering mixture into the hooded portion of the filter, the application of vacuum upon the interior of that portion of the surface is continued for the purpose of removing mother liquor contained in the cake. Upon further rotation, washing solvent, preferably of the same composition as the dewaxing solvent, from a tank 28 is applied to the surface of the filter cake through a pump 30, a pipe 32 and nozzles 34 positioned within the hood 18 adjacent to the filter cake.

The spray liquid is drawn through the filter cake into the interior of the drum and is separately withdrawn therefrom through the hollow shaft 20, filter valve 22 and pipe 36 into the filtrate storage tank 26. After the filter cake has advanced beyond the nozzles 34, chilled gas is introduced through pipe 38 to permit drying the cake and maintaining it in a cold condition by drawing the cold gas therethrough.

The wax cake is discharged from the filter surface after washing and drying by introducing, for a short period of time, a positive gas pressure to the interior of the particular segment of the filter drum in question, causing the filter fabric on drum 16 to bulge and loosen the cake which is then removed therefrom by scrapers 40. This reverse gas pressure may be effected by introducing chilled gas through the filter valve 22 from a blowback line 42 leading from a suitable source of supply.

The dislodged cake removed from the filter surface falls through the chutes 44 into a closed storage tank 46 from which it may be withdrawn for further treatment including the removal therefrom of retained oil and solvent.

Figure 3:
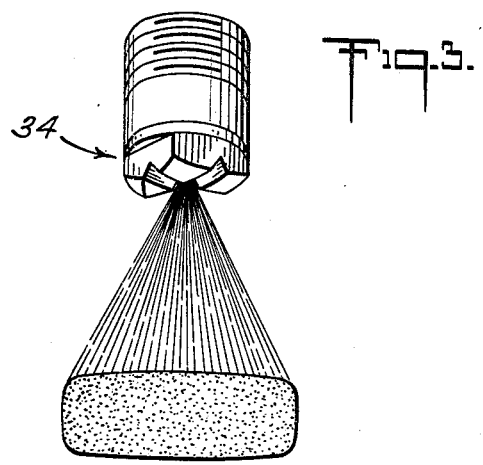
FIG. 3 is a perspective view of a nozzle producing a rectangular spray.

Although shown in FIGURE 1 as a single nozzle 34, in commercial scale apparatus a multiplicity of nozzles are used in one or more headers extending the length of the filter drum. In FIGURE 2, a multiplicity of solid cone nozzles 34, a single nozzle and its spray pattern being shown in greater detail in FIGURE 3, are spaced from each other in headers 66 and 64 so that the edges of the spray areas 70 through 87 of adjacent nozzles meet each other where the sprays impinge on the filter cake with a minimum of overlapping. Headers 64 and 66 are connected to cake washing liquid supply pipe 32. Where two or more headers are employed, each with a multiplicity of nozzles, it is preferred that the distance between headers is such that the edges of the spray patterns of the nozzles in each of the headers do not overlap unnecessarily.

As an example of the results obtained by operation of a solvent dewaxing unit in accordance with this invention, hollow cone type nozzles typical of those employed in the prior art were replaced by solid cone nozzles in the wash headers of a 500 square foot rotary vacuum dewaxing filter in a commercial solvent dewaxing unit operating on a Mid-Continent distillate oil with a dewaxing solvent consisting of 50% methylethyl ketone and 50% benzol. The filter cake was washed with wash solvent of the same composition with the wash solvent being sprayed onto the filter cake by means of spray nozzles arranged in six headers. Originally there were twelve 3/16" x 3/16" hollow cone spray nozzles in each header. The twelve hollow cone nozzles in a header were replaced by fifteen 1/8" square solid cone spray nozzles of a type described in U.S. Patent 2,305,210 which issued to Fred W. Wahlin on Dec. 15, 1942. The greater number of solid cone nozzles was required since the cake area covered by each solid cone spray was less than the area covered by each hollow cone spray. The use of fifteen solid cone nozzles gave the same total coverage as twelve hollow cone nozzles but the spray was distributed uniformly over the full width of the filter drum and highly improved results were obtained in the filter cake washing operation. A dramatic indication of the washing and solvent utilization superiority of the solid cone nozzles was visually apparent in the elimination of any wash solvent running down the face of the filter as in the case when hollow cone nozzles were used. For the production of wax cake of a given oil content, the amount of wash solvent used is reduced appreciably. It also has been found that there is less channelling of the wash solvent and less scoring of the wax cake with the result that a more uniform cake is produced.

While a vacuum type of continuous filter has been described, it is contemplated that the invention is equally well adapted to pressure filtration wherein superatmospheric pressures may be maintained on the exterior of the filtering surface.

While the invention has been described in connection with the separation of wax from wax-bearing oils, it is to be understood that it is also applicable to the deoiling of waxes and to the removal of similar types of solid materials from liquids wherein such separation is accomplished by means of a rotary filter.

Obviously, many modifications and variations of the invention, as hereinbefore set forth, may be made without departing from the spirit and scope thereof, and therefore only such limitations should be imposed as are indicated in the appended claim.

I claim:
1. In apparatus for separating oil and wax in the presence of a solvent for said oil comprising in combination a drum-shaped filter element partially submerged in a mixture of said oil, wax and solvent; means for rotating said filter element about its longitudinal axis whereby a given portion of said filter element is cyclically passed through said mixture and removed therefrom as said drum is rotated about said axis; means for forcing wax-free oil-solvent solution through said submerged portion of said filter element thereby depositing a filter cake of wax on the outside of said filter element; means for removing residual oil-solvent solution from said filter cake after rotating said filter element out of said mixture of oil, wax and solvent by washing with additional solvent; means for drying said washed filter cake on said filter element; means for removing said dried wax cake from said filter element; and means for removing said solvent from said oil-solvent solution to obtain dewaxed oil and solvent for reuse, the improvement which comprises providing a multiplicity of solvent wash nozzles producing rectangular solid spray patterns as said means for removing residual oil-solvent solution from said filter cake, said solvent wash nozzles being positioned parallel to said longitudinal axis of said filter element and spaced with respect to one another so that the edges of the spray areas of adjacent nozzles meet thereby providing substantially complete area coverage of said solvent wash along substantially the entire length of said filter element with substantially uniform distribution of wash solvent, and said solvent wash nozzles are positioned in a plurality of parallel rows which also are parallel to said longitudinal axis of said filter element, said rows of nozzles being spaced with respect to one another so that the edges of the spray areas of adjacent rows of nozzles meet one another.

References Cited

UNITED STATES PATENTS

| | | | |
|---|---|---|---|
| 2,134,331 | 10/1938 | Gee | 208—38 |
| 2,305,210 | 12/1942 | Wahlin | 239—601 |
| 2,484,304 | 10/1949 | Long et al. | 210—66 X |
| 3,152,986 | 10/1964 | Bice et al. | 210—67 |

SAMIH N. ZAHARNA, Primary Examiner

U.S. Cl. X.R.

210—391, 398, 68